Dec. 29, 1970  R. W. REIBER  3,551,052
BOUNDARY DETECTION APPARATUS
Filed Jan. 16, 1968  3 Sheets-Sheet 1

INVENTOR.
RICHARD W. REIBER
BY Joseph S. Iandiorio
ATTORNEY.

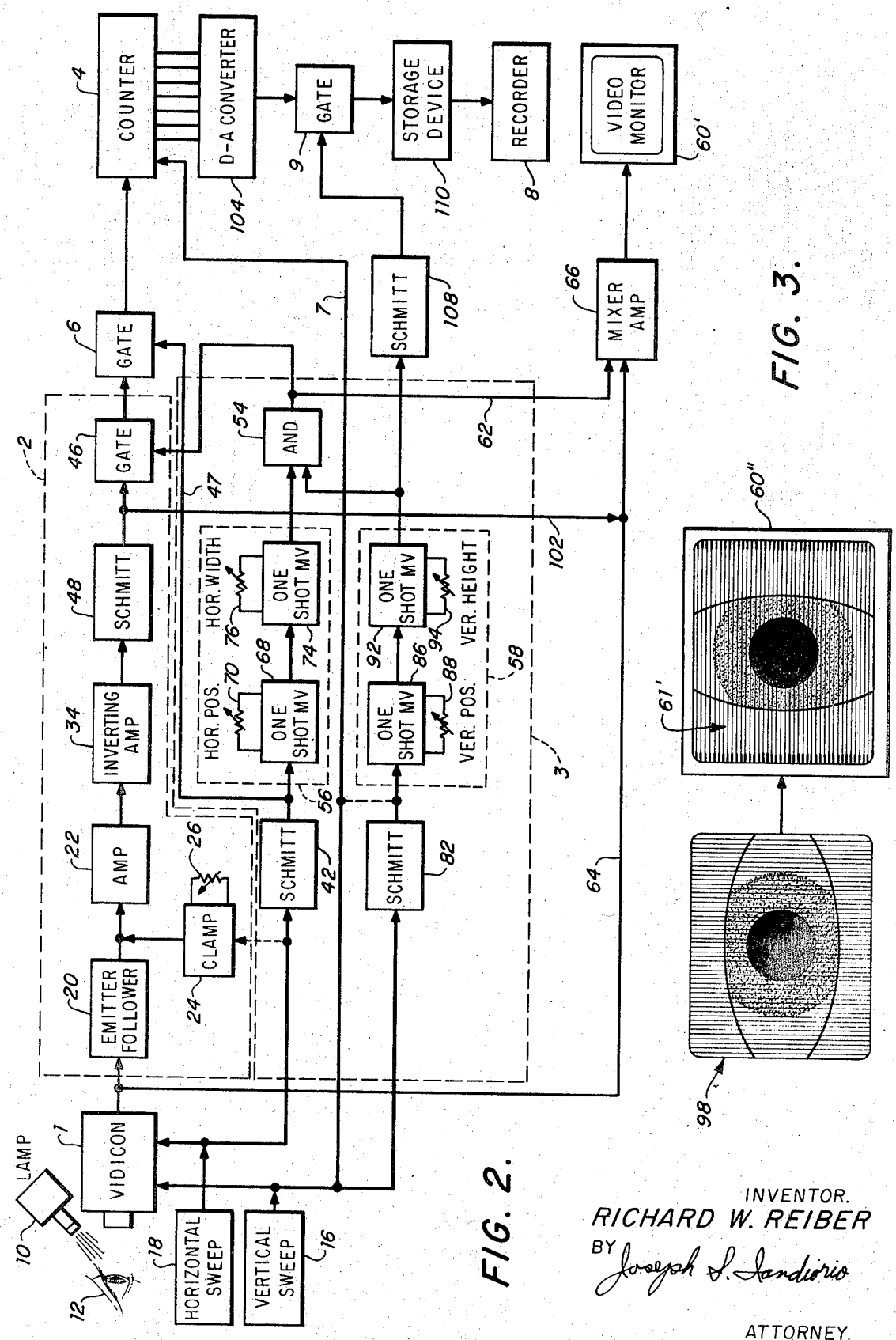

Dec. 29, 1970    R. W. REIBER    3,551,052
BOUNDARY DETECTION APPARATUS
Filed Jan. 16, 1968    3 Sheets-Sheet 3
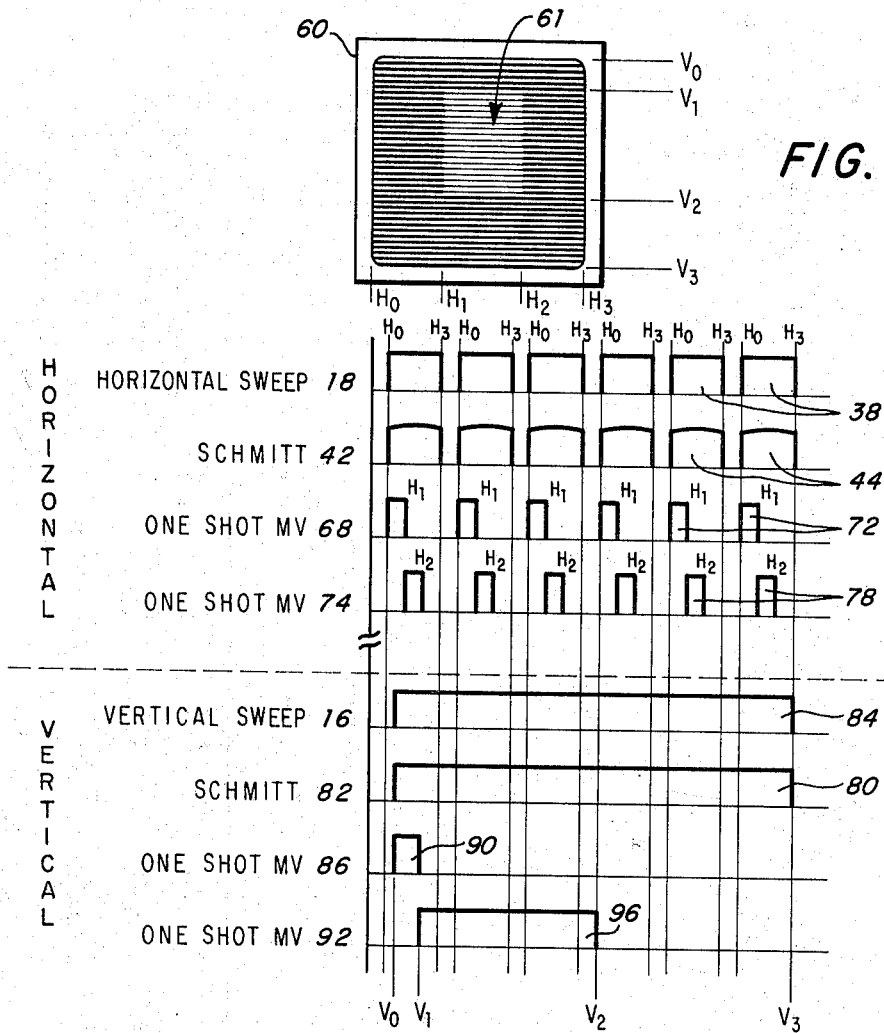
FIG. 4.
FIG. 5.
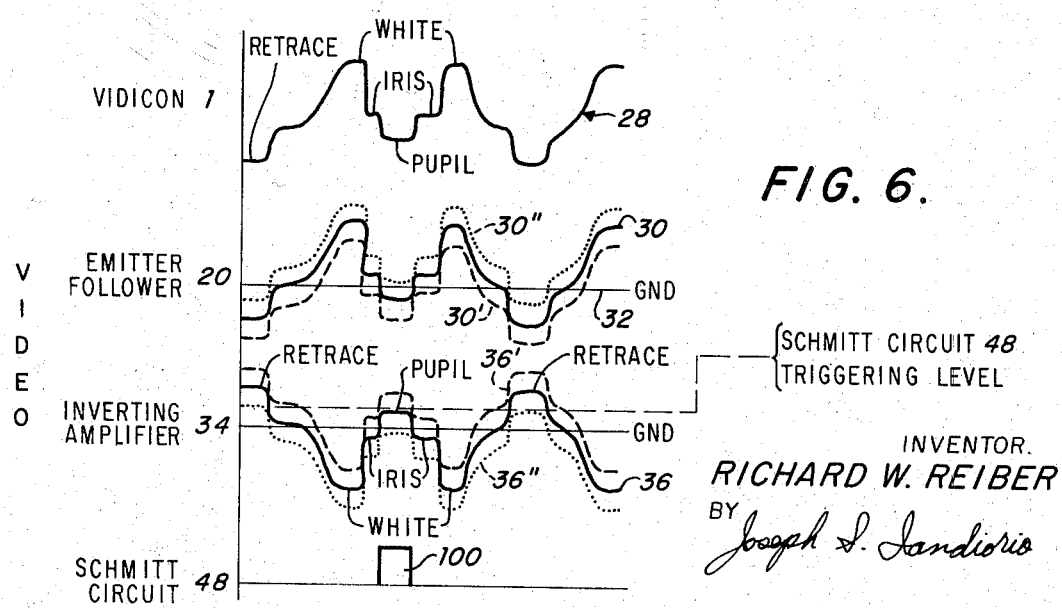
FIG. 6.
INVENTOR.
RICHARD W. REIBER
BY Joseph S. Sandiorio
ATTORNEY.

United States Patent Office 3,551,052
Patented Dec. 29, 1970

3,551,052
BOUNDARY DETECTION APPARATUS
Richard W. Reiber, Reading, Pa., assignor, by mesne assignments, to United States Testing Company, Inc., Hoboken, N.J., a corporation of New York
Filed Jan. 16, 1968, Ser. No. 698,308
Int. Cl. G01n 21/34; G01b 11/28
U.S. Cl. 356—51                                   5 Claims

ABSTRACT OF THE DISCLOSURE

Apparatus is disclosed for measuring the size of the pupil of an eye including means for irradiating an eye with radiant energy, a camera tube for sensing in a plurality of paths the radiation reflected from the eye, a level detecting circuit responsive to the video output of the camera tube for detecting radiation reflected from the pupil, and a counter, responsive to the level detecting circuit, for counting the number of paths containing radiation reflected from the pupil.

CHARACTERIZATION OF INVENTION

This invention is characterized in apparatus for measuring a dimension associated with a boundary between two surfaces having different light absorption characteristics, including first means for scanning an area containing the boundary a plurality of times over a number of different scanning paths, second means for detecting predetermined changes in light absorption each time the scanning means passes over the boundary, and third means coupled to the second means for counting the number of changes occurring over a given scanning interval.

BACKGROUND OF INVENTION

This invention relates to apparatus for measuring a dimension associated with a boundary between two areas having different light absorption characteristics, and, more particularly, to pupillometers for measuring the size of the pupil of the eye.

Many afflictions of the brain, the nervous system and the muscular system as well as diseases of the eye, may be detected by pupillary responses, or lack of responses. Proper diagnosis requires accurate measurement of the pupil and, in some cases, additionally requires that accurate relative measurements of the pupil be made continuously for a period of time so that repeated reactions to a number of stimuli may be observed and analyzed.

Fast, accurate and continuous measurement of the size of the pupil also has application in lie detection apparatus and in recording customer reaction to cinema and television advertising and to product packaging, for the pupil generally dilates when focused on a view which pleases the subject.

SUMMARY OF INVENTION

Thus it is desirable to have available apparatus for measuring a dimension associated with a boundary between surfaces having different light absorption characteristics.

It is also desirable to have available an accurate pupillometer having the capability to continuously sense rapid pupillar movement over a period of time.

The invention may be accomplished by using a vidicon to scan the eye, a pupil edge detector coupled to the vidicon to provide an indication each time the pupil is encountered during a scan, and a counter for counting the number of scans in which the pupil was detected, the count accumulated in the counter thereby representing the width of the pupil.

DESCRIPTION OF SPECIFIC EMBODIMENT

Other objects, features, and advantages of the invention will appear from the following description of a preferred embodiment as shown in the attached drawings, in which:

FIG. 2 is a detail showing of the diagram of FIG. 1;

FIG. 3 is a diagram of the view, sensed by the camera, on the left, and the view displayed on the monitor, on the right, showing the ninety-degree rotation of the camera field;

FIG. 4 is a diagram of the monitor display with a reduced guard area;

FIG. 5 is a chart showing the timing relationships of various signals involved in generating the guard area of FIG. 4;

FIG. 6 is a chart of video signals in the system.

Figure 1:
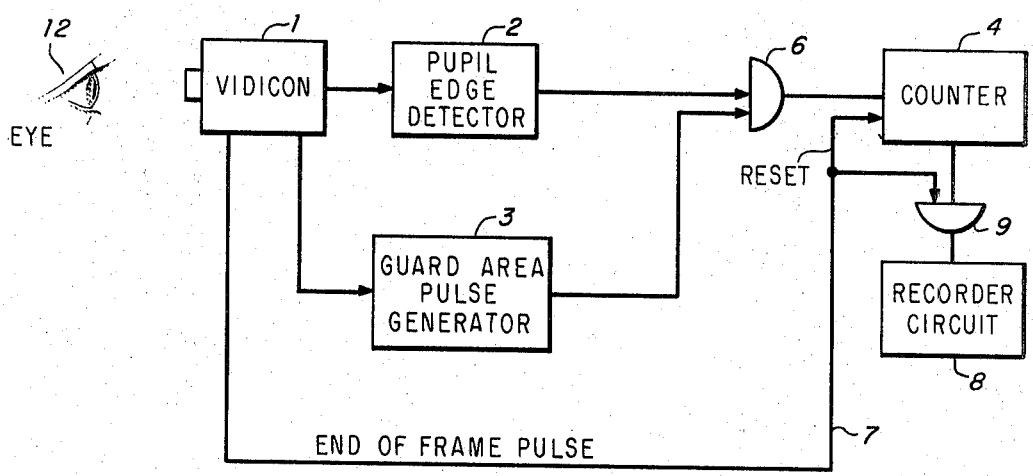
FIG. 1 is a block diagram of a pupillometer according to this invention.

In accordance with a preferred embodiment of the present invention, schematically illustrated in FIG. 1, an object whose size is to be determined such as the pupil of an eye 12, is scanned by vidicon 1. Each time the boundary of the pupil is sensed by the vidicon, an output pulse is produced by pupil edge detector 2 coupled to the vidicon. A certain number of pulses will be produced per scanning frame for a given pupil size, depending upon the number of scan lines which cross the pupil boundary. Should the diameter of the pupil increase perpendicular to the scanning direction, more scanning lines will intersect the pupil and a greater number of pulses will be produced by the pupil edge detector per frame. In like manner, as the diameter of the pupil decreases, a lesser number of pulses will be produced for each scanning frame. These pulses are counted on a per frame basis by counter 4 coupled to the output circuit of detector 2 through AND gate 6. At the end of each frame, a pulse is generated on lead 7 to reset the counter and transfer the count therein into conversion circuitry or directly into recorder circuit 8 via AND gate 9. Due to the high rate of video scanning, rapid changes of pupil diameter may be accurately recorded.

Guard area pulse generator 3 is connected to AND gate 6 so as to permit counting to occur only during those intervals when detection of the pupil occurs within the guard area 61'. schematically illustrated in FIG. 3. In other words, guard area pulse generator 3 electronically creates a "window" through which counting may occur, so that other spurious pupil level signals produced by scanning other darkened portions of the eye, such as eyelids, are eliminated to prevent an erroneous count. The guard area will be somewhat larger than the area occupied by the pupil which is the only area of examination of the interest in detecting the size of the pupil.

There is shown in FIG. 2 a lamp 10 irradiating with visible light an eye 12 which is being scanned by vidicon 1 which may be driven at 60 cycles per second by vertical sweep circuit 16 and at 15,750 cycles per second by horizontal sweep circuit 18 providing a typical raster of 525 lines per frame. The actual number of lines sensing eye 12 per raster in this embodiment is only one-half of the 525 lines—262½—because an interlace 30 cycle per second vertical sweep is used. Any number of lines per frame may be used and the greater the number of lines available to scan the eye, particularly the pupil, the better will be the resolution and accuracy of the system. The accuracy may also be improved by causing lamp 10 to emit infra-red radiation and providing an infra-red sensitive vidicon. The use of infra-red radiation takes advantage of the sharp difference between the infra-red absorption characteristics of the pupil and those of the iris and surrounding eye portions. With infra-red sensitive equipment even the darkest iris may be easily distinguished from the black pupil.

The video output from vidicon 1 is delivered to emitter follower 20 and from there to amplifier 22, both included in pupil edge detector 2. Amplifier 22 in conjunction with clamp circuit 24 and control 26 constitute a variable clamping or slicing circuit which "slices" off a portion of the lower part of the A.C. video signal 28, FIG. 6, at the output of emitter follower 20. Signal 28 contains a retrace level which is the blackest and most negative portion of the scan encountered. From the retrace, signal 28 increases positively as the eyelids and surrounding area are scanned, until the white of the eye is being sensed, at which point the brightness or whiteness of the scene sensed is at the highest level. An abrupt decrease in brightness and voltage is experienced when the iris is encountered and a further abrupt decrease is experienced when the pupil is sensed.

At the output of emitter follower 20 signal 28 is clamped and appears as signal 30, FIG. 6, which has been clamped to a negative voltage level below (GND) line 32. In this form signal 30 is inverted by inverting amplifier 34 which produces the signal 36.

Output pulses 38 from horizontal sweep circuit 18 are supplied to Schmitt trigger circuit 42 which produces output pulses 44. The output of horizontal sweep circuit 18 may be supplied to clamp circuit 24 so that the clamping function is performed only during the time of a horizontal line sweep, for it is not essential to clamp the retrace portion which will be later eliminated from the data supplied to counter 4. The output of Schmitt trigger circuit 42 is applied to control gate 6 via line 47 to permit only the portions of signal 36 which occur during a horizontal line sweep to pass to counter 4. In this manner the very black retrace portions of signal 36, which are more than ample to trigger Schmitt circuit 48, are prevented from reaching counter 4. Each time a pupil-level blackness is detected by Schmitt circuit 48 a pulse is generated, which if passed by gate 46 may be delivered to counter 4, there to be counted and accumulated over a frame period.

Whether or not such a pulse will be delivered is dependent on the condition of gate 46 which is enabled by AND circuit 54 of guard area pulse generator 3 when both of its inputs are present. The inputs to AND circuit 54 are derived from the guard area pulse generator 3, including a horizontal dimension setting portion 56 and a vertical dimension setting portion 58. Horizontal dimension setting portion 56 operates to set the period from $H_1$ to $H_2$, occurring during the horizontal sweep from $H_0$ to $H_3$, FIG. 4, during which period counter 4 may receive pulses to count. Vertical dimension setting portion 58 operates to set the period from $V_1$ to $V_2$, occurring during the vertical sweep from $V_0$ to $V_3$ during which period counter 4 may receive pulses to count. Thus, spurious, pupil-level signals, occurring outside the guard area defined on the face of monitor 60, FIG. 4, by dimensions $H_1$, $H_2$, $V_1$, and $V_2$, cannot be communicated to counter 4 and cannot cause false pupil detections.

As an aid in setting up the system the output of AND circuit 54 may be connected on line 62 with the video output from vidicon 1 on line 64 to mixer amplifier 66 where the two are combined and submitted to monitor 60' to provide a raster having a lightened or brightened region defining the guard area, which brightness is caused by the increased positive voltage level at those times in the sweep caused by the addition of AND circuit 54 output to the original video signal on line 64.

Portion 56 of the guard area pulse generator 3 includes a one-shot multivibrator 68 which is switched on at time $H_0$ by the leading edge of pulse 44 from Schmitt circuit 42 and switched off without external triggering at time $H_1$ as determined by the delay introduced by potentiometer 70. The output signal 72 of multivibrator 60 is fed directly to one shot multivibrator 74 which is switched on at time $H_1$ by the lagging edge of pulse 72 and switched off without external triggering at time $H_2$ as determined by potentiometer 76. The output signals 78 of multivibrator 74 therefore define the limits of the period $H_1$ to $H_2$, the horizontal dimension of the guard area.

Portion 58 of the guard area pulse generator 3 is driven by the output pulses 80 of Schmitt trigger circuit 82 which is driven by the output pulses 84 from the vertical sweep circuit 16. The output of Schmitt circuit 82 may also be applied on line 7 to counter 4 which is reset at the end of each frame or vertical sweep by the negative going, lagging edge of pulse 80. An advantage in having Schmitt circuit 82 rather than vertical sweep circuit 16 driving line 7 is the sharp pulse produced by circuit 82. Portion 58 includes a one-shot multivibrator 86 which is switched on at time $V_0$ by the leading edge of pulse 80 from Schmitt circuit 82 and switched off without external triggering at time $V_1$ as determined by the delay introduced by potentiometer 88. The output signal 90 of multivibrator 86 is fed directly to one-shot multivibrator 92 which is switched on at time $V_1$ by the lagging edge of pulse 90 and switches off without external triggering at time $V_2$ as determined by potentiometer 94. The output signals 96 of multivibrator 92 therefore define the limits of the period $V_1$ to $V_2$, the vertical dimension of the guard area.

For increased resolution the guard area may be expanded so that it occupies nearly all of the raster area leaving but a small border portion, as appears on monitor 60″, FIG. 3, which is reproducing the image 98 as received by vidicon 1. Expansion of the horizontal dimension is accomplished by adjusting potentiometer 70 so the $H_1$ occurs earlier in the horizontal sweep period, i.e. closer to $H_0$, and adjusting potentiometer 76 so that $H_2$ occurs later in the horizontal sweep period, i.e. closer to $H_3$. And expansion of the vertical dimension is accomplished by adjusting potentiometer 88 so that $V_1$ occurs earlier in the vertical sweep period, i.e. closer to $V_0$, and adjusting potentiometer 94 so that $V_2$ occurs later in the vertical sweep period, i.e. closer to $V_3$.

The positive pulses 100, FIG. 6, produced by Schmitt circuit 48 may be delivered on line 102 to line 64 where they are mixed with the video output signal 28 from vidicon 1 for display on monitor 60'. The increased positive voltage level resulting from combining pulses 100 with video output 28 causes a white or light gray overlay region to appear superimposed on the image of the pupil on monitor 60' when control 26 is properly set. That is, when control 26 is set so that Schmitt circuit 48 is triggered only by the pupil and not the iris, the entire pupil area displayed on monitor 60' will appear light gray or white, rather than black. When the clamping level for signal 28 is set too low by control 26, signal 28 may appear in the position of signal 30', FIG. 6, where the iris as well as the pupil portion of that signal may be held below ground. As a result after inversion of signal 30' by inverting amplifier 34, both the iris and pupil portions of signal 36', FIG. 4, are above the level necessary to trigger Schmitt circuit 48 and the light gray overlay will cover a portion of the iris as well as the pupil. Since Schmitt circuit 48 is being triggered by iris-level voltages, the count accumulated in counter 4 may be an erroneous indication of the size of the pupil. When the clamping level for signal 28 is set too high by clamp control 26, signal 28 may appear in the position of signal 30″, FIG. 6, where neither the iris nor the pupil portions of that signal are held at or below ground. As a result after inversion of signal 30″ by inverting amplifier 34 there will be no signal level capable of triggering Schmitt circuit 48 and there will be no light gray overlay visible. In both situations the size of the gray overlay may be adjusted to coincide with the area of the pupil so that Schmitt circuit 48 triggers on only pupil-level light levels. Thus, control 26 may be adjusted by an operator who is guided by the visual display of the overlay on monitor 60' so that only the pupil is being detected, even though the contrast between pupil and iris is less than necessary for unaided detection by the sensitivity of the system.

The digital information in counter 4 is transformed by digital-to-analog converter 104 to an equivalent analog voltage level, which is gated out at the completion of each frame by gate 9. An enabling signal is provided to gate 9 at the end of each frame by Schmitt circuit 108 which is triggered by the negative-going, lagging edge of pulse 96. From gate 9 the information is transferred to storage device 110 where the voltage level is maintained during the next frame to provide a constant output signal to recorder 8 which has slow response relative to the output frequency of gate 9.

It should be appreciated that converter 104, gate 9, and storage device 110 may be arranged in many combinations: gate 9 may be placed between converter 104 and counter 4; storage device 110 may be connected directly, or through gate 9, to counter 4, with converter 104 being connected to the output of storage device 110.

In operation, eye 12 is positioned to be illuminated by lamp 10 and vidicon 1 is focused on eye 12 to provide an image 98 of the pupil which will be displayed on the monitor. Potentiometers 70, 76, 88, and 94 are adjusted to provide a guard area sufficient to encompass the pupil with enough tolerance to contain the pupil throughout normal eye movement. With an image such as image 98 sensed by vidicon 1, the display on monitor 60' is similar to that shown in FIG. 3 on monitor 60". Control 26 is then adjusted so that the output from Schmitt circuit 48 causes a light gray overlay coincident with the area of the pupil on monitor 60'.

The video signal produced by vidicon 1 passes through emitter follower 20 and is clamped by clamp circuit 24 at the input to amplifier 22. At inverting amplifier 34 the portion of the video signal clamped below ground appears above ground and is of a sufficient level to trigger Schmitt circuit 48.

Each time a horizontal sweep of vidicon 1 is begun by horizontal sweep circuit 18, a pulse from Schmitt circuit 42 on line 47 enables gate 6 to pass signals from the output gate 46 provided to gate 46 by Schmitt circuit 48. And there will be no such signals at the output of gate 46 unless the enabling signal from AND circuit 54 is present at gate 46. AND circuit 54 provides the enabling signal only when vidicon 1 is sweeping within the guard area, i.e. the outputs from multivibrators 74 and 92 are both present.

While vidicon 1 is scanning within the guard area, signals from Schmitt circuit 48 are being counted in counter 4 and converted to analog form by converter 104. When the scanning reaches the lower boundary of the guard area, the negative-going lagging end of pulse 96 triggers Schmitt circuit 108 which then enables gate 9 to pass the level contained in converter 104 to storage device 110 where it may be used to drive recorder 8. Thereafter, the lagging negative-going edge of pulse 80 is applied on line 7 to clear counter 4 in preparation for the scanning of eye 12 by the next frame.

One might practice the present invention by scanning an object transverse to a boundary to be measured with a thin light beam reflected off of a mirror galvanometer which is angularly rotated in the X and Y modes by an electrical transducer to cause the beam to scan the object. A photomultiplier could be positioned to detect the aforesaid drop in reflectivity each time the beam strikes the edge of the object. One could measure, for example, the height or diameter of a block or ball for a ball bearing by positioning the ball between the light scanner and the photomultiplier to detect a drop in transmittance rather than reflectance. In any event, areas separated by a boundary having predetermined differences in light absorption characteristics are examined within a scanning area which contains the boundary to thus measure a dimension associated with the boundary.

It should be appreciated that various components may be substituted to perform the functions of the components herein described, and that various arrangements of components may be used to accomplish the invention and that all such variations are within the following claims:

What is claimed is:

1. A pupillometer for measuring a diameter of the pupil of an eye comprising in combination: means for illuminating an eye, scanning means including a vidicon for repeatedly scanning with a parallel line scan an area encompassing at least the entire pupil and a portion of the adjacent iris of an eye, detecting means coupled to an output of said vidicon for producing an output signal whenever the magnitude of the signal from the vidicon equals or exceeds in the dark direction that signal corresponding to vidicon response to light energy reflected from the pupil of the eye, gate means, means for coupling said output signal to said gate means, means coupled to said gate means for preventing the passage of said output signal when it corresponds to a retrace signal from said vidicon, a signal counter coupled to receive and count signals passed by said gate means, means coupled to said counter for causing reset thereof at the end of each complete scan of said area, and means coupled to said counter for indicating the final count entered in said counter prior to each reset thereof.

2. A pupillometer according to claim 1, wherein said means for coupling said output signal to said gate means includes a second gate means, and wherein further means are provided coupled between said scanning means and said second gate means for applying a control signal thereto for suppressing the passage of signals to said first mentioned gate means during a selectable portion of each line scan to provide a guard area coinciding with the area of interest outside of which spurious signals are suppressed.

3. A pupillometer according to claim 2, further comprising: a video monitor, mixing means, means coupled therebetween for applying said control signal from said further means to an input of said mixing means, means coupling the video output of said mixing means and means coupling an output of said mixing means to said monitor for displaying the scene scanned by said scanning means along with a visual representation of said guard area.

4. A pupillometer according to claim 3, further comprising means coupled thereto for adjusting the operating level of said detecting means, and means coupling said output signal from said detecting means to an input of said mixing means for providing on said monitor a visual indication as to the correct adjustment of said means for adjusting.

5. A pupillometer according to claim 2, comprising a video monitor, mixing means, means coupling the video output of said scanning means to an input of said mixing means, means coupled thereto for adjusting the operating level of said detecting means, means coupling said output signal from said detecting means to an input of said mixing means, and means coupling an output of said mixing means to said monitor for displaying the scene scanned by said scanning means along with a visual indication as to the correct adjustment of said means for adjusting.

References Cited

UNITED STATES PATENTS 2,756,627   7/1956   Boycks _____ 356—158
3,218,389  11/1965  Reed _____ 356—156X RONALD L. WIBERT, Primary Examiner P. K. GODWIN, Assistant Examiner U.S. Cl. X.R.

356—167

PO-1050
(5/69)

UNITED STATES PATENT OFFICE
CERTIFICATE OF CORRECTION

Patent No. 3,551,052                     Dated December 29, 1970

Inventor(s) RICHARD W. REIBER

It is certified that error appears in the above-identified patent and that said Letters Patent are hereby corrected as shown below:

Column 2, line 54, "the" (first occurrence) should be deleted.

Column 3, line 74, "60" should read --68--.

Column 6, line 42, before "mixing" there should have been inserted --scanning means to another input of said--.

SIGNED AND
SEALED
MAR 9 1971

(SEAL)
Attest:

Edward M. Fletcher, Jr.
Attesting Officer

WILLIAM E. SCHUYLER, JR.
Commissioner of Patents